J. W. FITZGERALD.
SHOCK ABSORBER.
APPLICATION FILED JULY 14, 1919.
1,333,592. Patented Mar. 9, 1920.
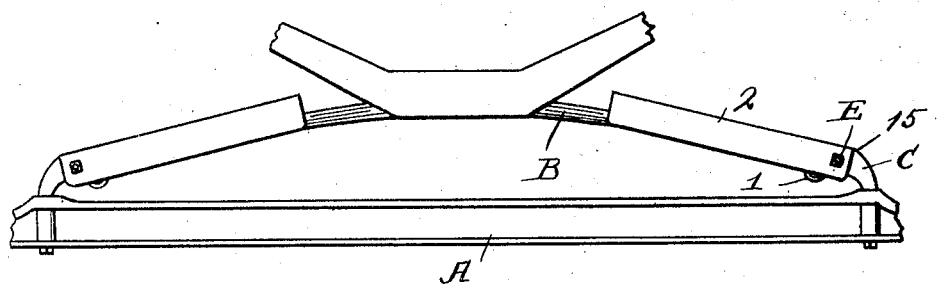
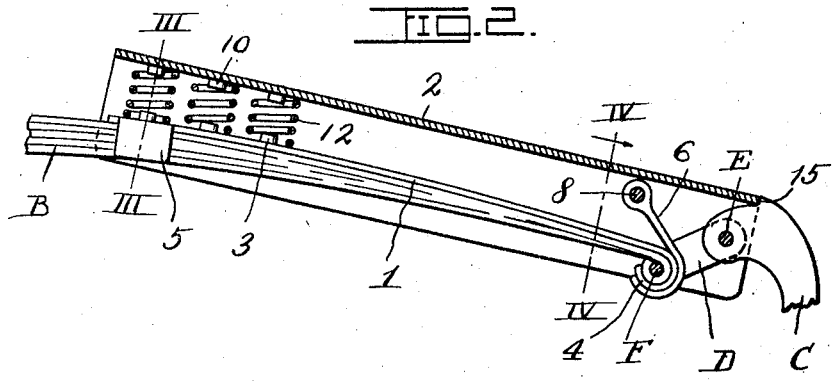
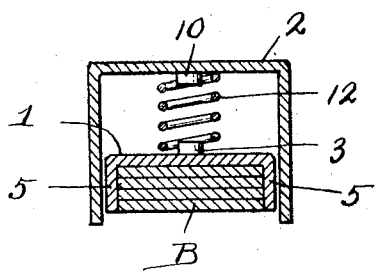 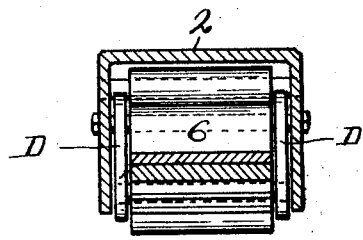
WITNESS:
L. J. Fischer
INVENTOR:
John W. Fitzgerald,
BY
F. G. Fischer
ATTORNEY.

UNITED STATES PATENT OFFICE.

JOHN W. FITZGERALD, OF KANSAS CITY, MISSOURI, ASSIGNOR OF ONE-HALF TO EDWARD KEATING, OF KANSAS CITY, MISSOURI.

SHOCK-ABSORBER.

1,333,592.      Specification of Letters Patent.      Patented Mar. 9, 1920.

Application filed July 14, 1919. Serial No. 310,685.

*To all whom it may concern:*

Be it known that I, JOHN W. FITZGERALD, a citizen of the United States, residing at Kansas City, in the county of Jackson and State of Missouri, have invented certain new and useful Improvements in Shock-Absorbers, of which the following is a specification.

My invention relates to improvements in shock absorbers for automobiles, and my object is to provide a simple, inexpensive and efficient device of this character whereby shocks incident to traveling over a rough road are absorbed by the device instead of being transmitted to the body of the vehicle.

While the device is applicable for general use, it is more particularly adapted for use on Ford cars, and in order that the invention may be fully understood, reference will now be had to the accompanying drawing, in which:

Figure 1 is a fragmentary elevation of the front portion of a Ford car with the front spring equipped with the invention.

Fig. 2 is a fragmentary view of one of the automobile springs equipped with one of the shock absorbers.

Fig. 3 is a cross section on line III—III of Fig. 2.

Fig. 4 is a cross section on line IV—IV of Fig. 2.

Referring now in detail to the various parts, A designates the front axle, B the front spring, C the hangers, D the links whereby the ends of the spring B are operably connected to the hanger C, E the pivots extending through said links D, and the hangers C, and F the pivots extending through the spring B and the links D.

The foregoing parts are of usual construction, excepting the pins E, which are longer than usual to extend through certain parts of the devices to hold them in place. I will now proceed to describe my invention in detail. 1 designates a plate which rests upon the spring B, it being held in position at one end by its curved terminal 4 engaging the adjacent end of the spring B and at its opposite end by depending flanges 5 loosely embracing the sides of said spring B.

2 designates a lever, preferably, of channel-bar formation to fit over the top and sides of the spring B and assist in holding said lever 2 in position. The lever 2 is fulcrumed at one end upon the pivot E and is provided near its opposite end with projections 10, for a purpose which will hereinafter appear.

6 designates a hook mounted at its upper end on a pivot 8 and extending at its lower end around the curved terminal 4 of the plate 1.

The plate 1 is provided with studs 3, which, together with the studs 10 are loosely embraced by supplemental coil springs 12. Normally the lower end of the lever 2 rests against a shoulder 15 formed on the hanger C, as disclosed on Fig. 2. In practice, the parts are so proportioned and arranged that the hook 6 pulls the upper end of the lever 2 downwardly and thus holds the springs 12 under compression.

The action is substantially as follows: When a wheel of the car strikes an obstruction the ends of the spring 1 tend to move apart and swing the free ends of the links D downwardly. This causes the hooks 6 to pull downwardly upon the levers 2 and compress the springs 12, thereby absorbing the shock before it can be imparted to the body of the car.

While I have only shown the front spring of the car equipped with the shock absorbers, it will be understood that the rear spring can be likewise equipped.

From the foregoing description it will be readily understood that I have produced a shock absorber embodying all of the advantages above enumerated, and while I have shown and described the preferred arrangement of my invention, I also reserve the right to make such changes in the proportion, construction and arrangement of parts as properly fall within the spirit and scope of the claim.

Having thus described my invention, what I claim and desire to secure by Letters Patent, is:

In combination with the hangers, links and a main spring of an automobile, levers pivotally connected to the hangers and overlying the main spring, shoulders on the hangers against which the levers abut to limit the upward movement of the levers, supplemental springs interposed between the main spring and the levers, and hooks pivoted to the levers and engaging the ends of the main spring, for the purpose described.

In testimony whereof I affix my signature in the presence of two witnesses.

JOHN W. FITZGERALD.

Witnesses:
F. G. FISCHER,
L. J. FISCHER.